Figure 1:
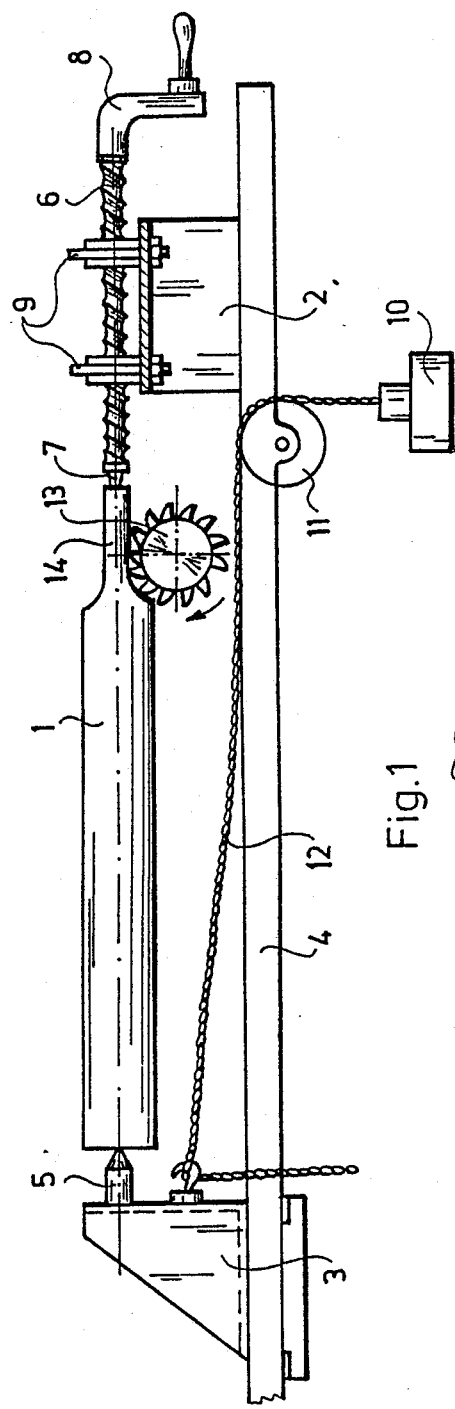

United States Patent [19]

Herenyi et al.

[11] Patent Number: 4,915,149

[45] Date of Patent: Apr. 10, 1990

[54] APPARATUS FOR PRODUCING FURNITURE

[76] Inventors: Karolyne Herenyi, Bezeredy u. 4, 1081 Budapest; Gabor Toth, Csanyi u. 14, 1203 Budapest, both of Hungary

[21] Appl. No.: 201,921

[22] Filed: Jun. 3, 1988

[51] Int. Cl.$^4$ .............................................. B27F 5/00
[52] U.S. Cl. ...................................... 144/84; 142/48; 144/74; 144/203; 144/347; 403/248
[58] Field of Search .................. 144/84, 46, 74, 93 R, 144/203, 204, 345, 347, 353, 355; 403/248, 249, 280; 409/131, 132, 219, 221, 224, 226, 228, 229; 82/31; 142/45, 48, 53, 56, 28, 39

[56] References Cited

U.S. PATENT DOCUMENTS

| 120,117 | 10/1871 | Snyder | 144/84 |
| 678,894 | 12/1901 | Mayers | 144/347 |
| 1,516,975 | 11/1924 | McArthur | 144/347 |
| 2,344,365 | 3/1944 | Phillips | 142/56 |
| 2,735,460 | 2/1956 | Clausing | 144/134.12 |
| 2,923,328 | 2/1960 | Colledge, Jr. | 142/53 |
| 2,999,519 | 9/1961 | Peterson | 144/46 |
| 3,128,131 | 4/1964 | Bianchini | 403/248 |
| 3,297,063 | 1/1967 | McGuire | 144/353 |
| 3,721,279 | 3/1973 | Bowen | 142/48 |
| 3,955,608 | 5/1976 | Smiltneek | 144/208 B |
| 4,505,313 | 3/1985 | Finn | 405/248 |

FOREIGN PATENT DOCUMENTS

| 22861 | 10/1900 | Fed. Rep. of Germany | 403/248 |
| 539761 | 12/1931 | Fed. Rep. of Germany | 144/74 |

Primary Examiner—W. Donald Bray
Attorney, Agent, or Firm—Young & Thompson

[57] ABSTRACT

A new method for the production of furniture is provided comprising the steps of providing tree trunks and branches; debarking, drying and cutting said tree trunks or branches to the desired size; producing tenons and mortises in respective ends of said cut tree trunks or branches, said tenons being sized to cooperatively engage said mortises; and assembling furniture from said cut tree trunks or branches by inserting said tenons into said mortises in order to fix respective tree trunks or branches to one another.

4 Claims, 2 Drawing Sheets

APPARATUS FOR PRODUCING FURNITURE

The invention relates to a method for producing furniture, wherein wooden elements of furniture are produced and fixed to one another. The invention also relates to an apparatus for producing furniture having a tenoning machine and a counter-gauge.

The method and apparatus as mentioned above are well known in the furniture industry. However, the necessary wooden starting material of relatively high quality is quite different to obtain, and the cost of this wooden material is also ever increasing. Therefore, the proportion of materials replacing lumber in the furniture industry constantly increases which has a disadvantageous effect on the esthetics and quality of the furniture produced by this industry.

In our modern, quite mechanized world, besides fulfilling its function, the need for an esthetic value of the furniture arranged in the flat, in the summer house, in the garden, or in the human environment is more and more urging. In the state of the art, this need is not satisfied at all, especially in the case of the so called rustic or country furniture which could be used as furnishings of inner living rooms for instance and being in contrast to many factors of our contemporary life.

As is mentioned above, the traditional furniture industry requires wood or lumber having a quite high quality. But, because of this reason, the greater part of the wood produced by the forest industry can not find utilization for the production of furniture, since only a relatively small amount of the lumber satisfies the measurement and quality requirements of the furniture industry. Accordingly, this intensifies the difficulties as mentioned above.

The main object of the present invention is to provide a method and an apparatus, with the help of which natural wood or lumber can be used as starting material of furnitures. A further object of the invention is to make possible the utilization of a much wider range of wood for furniture production as previously. Still another object of the invention is to provide an assortment of rustic or country furnishings made of natural materials.

According to the improvement of the known method for producing furniture in this invention, tree-trunks or tree branches are used as starting material, they are debarked, dried and cut to size; and bores or mortises and/or, on at least one of their ends, tenons fitting into the mortises will be produced in them; and, finally, the furniture will be assembled by inserting the tenons into the mortises.

In a preferred realization of the method in this invention, waste material of forestry, especially pruned tree-trunks resulting from the clearing of trees and/or branches of old trees ripe for felling are used as starting material. Tree-trunks or tree branches having a diameter smaller than 20 cm can also be used as starting material.

It is still another preferred realization, wherein the sarting material is debarked directly after winning out the starting material having a high moisture content.

In another preferred realization of this invention, the starting material is debarked and cut and, thereafter, dried and for the drying, microwave energy is used.

It can also be preferred, when the furniture is provided with upholstery preferably made of woven or spun material, especially of natural materials, the upholstery is fixed onto the furniture elements delimiting upholstered surfaces of the furniture.

It is still another preferred realization, wherein the furniture is provided with at least one wooden board arranged in a longitudinal groove formed in the furniture elements, the board is preferably made of debarked and dried planks being planed or moulded on its edges.

According to the improvement of the apparatus in this invention, the tenoning machine and the counter-gauge are formed as stations of the apparatus and each has grips for holding tree-trunks or tree branches during their working process, and at least one of the grips of the tenoning machine and the counter-gauge, respectively, is slideably arranged on frames of the machines.

In a preferred embodiment of the apparatus in this invention, one of the grips of the tenoning machine and the counter-gauge, respectively, has a turning fork onto which the tree-trunk or the tree branch is connected without rotation, and the other of the grips of them, respectively, has a thrust center onto which the tree-trunk or the tree branch is rotationally connected.

In this case, it can be preferred, when the thrust center is connected to the slideable grip of the tenoning machine, and the other grip has a rod adjustable in longitudinal direction preferably by a screw-and-nut connection and the turning fork is arranged on an end of the rod facing the thrust center.

In still another preferred embodiment of the apparatus in the is invention, the tenoning machine has a rotationally driven milling disk being adjustable perpendicularly to as well as parallel to the longitudinal axis of the tree-trunk or the tree branch, and the slideable grip is pressed with a constant force against the end of the tree-trunk or the tree branch.

It is also preferred, when the counter-gauge has in one of its grips a rod adjustable in longitudinal direction preferably by a screw-and-nut connection and the thrust center is arranged on an end of the rod facing the other grip, and the turning fork rotatable but retainable in certain angular positions is connected to said other grip, and the counter-gauge has a driller, an axis of which being perpendicular to the longitudinal axis of the tree-trunk or the tree branch.

In this case, it is preferable, when the grips of the counter-gauge are fixed on a slide bed arranged slideably but retained in certain positions on the frame of the counter-gauge.

Figure 2:
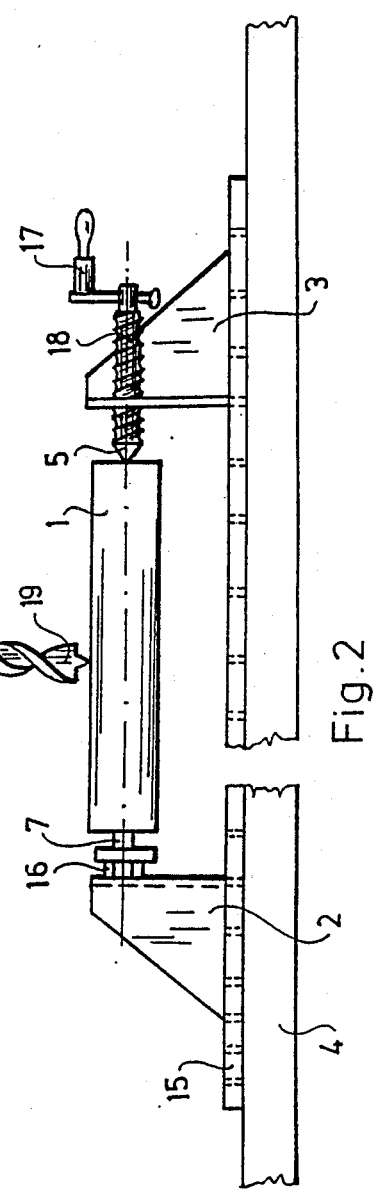
Figure 3:
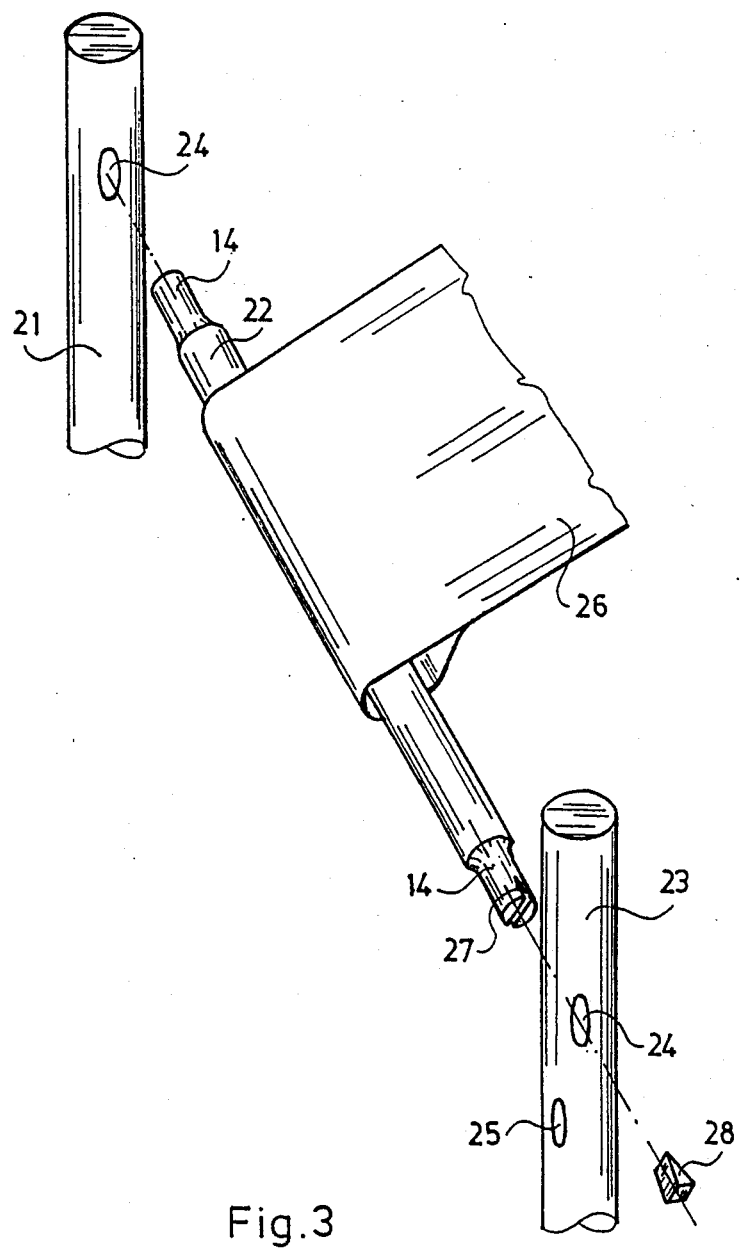

Other objects and advantages of the invention will be described hereinafter in greater detail by reference to accompanying drawings. In the drawings, FIG. 1 shows a schematic side elevational view of one of the stations of the apparatus in this invention: that of the tenoning machine, FIG. 2 is the same illustration as in FIG. 1 but for another station: the counter-gauge, FIG. 3 illustrates a method of manufacturing furniture in accordance with the invention.

In accordance with the invention, tree-trunks or tree branches can be made useful which are not useful in traditional lumbering, sylvicultural methods. As is well known, for example, the new forestation of pine-wood forests must be cleared by felling 5 to 10 year old trees to enhance the growing of the remaining stand. In most cases, the timber resulting from this clearing of the forest will even not be gathered and it will never be removed from the forest. The same happens to the tree branches removed from tree-trunks having high value. According to the known methods, these branches having a diameter of 2 to 20 cm are regarded as waste material. In accordance with the invention, such trunks and branches are useful.

According to the invention, the relatively straight trunks and branches having a diameter smaller than 20 cm are selected from among the above mentioned materials and, preferably at the spot of the felling, the bark will be removed from them, when the trees have the normal living moisture content. The step of debarking can be realized with the help of a special machine carried to the spot of felling. Nevertheless, the selected trunks or branches can be transported to a place of further processing and they can be debarked therein with the aid of the special debarking machine.

In this example, the debarked starting material will be cut to size which results in debarked wooden material cut to size and having a diameter smaller than 20 cm. After this, the wooden material should be dried for which the conventional drying methods can be used. However, it is more convenient to dry the wooden material by exposing it to microwave energy since, in this way, the timber dries quickly and without splits or cracks or any deformation or warping. After this, the tenons and mortises acommodating the tenons will be produced, for the purpose of which the apparatus according to this invention can preferably be utilized. The elements formed in this way will be connected to each other by inserting the tenons into the corresponding mortises. The connecting force between the elements can be increased by forming longitudinal incisions in the tenons along their symmetry axes and after inserting the tenons into the mortises, driving a wedge expander into each incision. Further to this, the tenons can be glued into the mortises with which the connecting security between the elements will further be increased.

The elements of the furniture can be provided with a surface coating which can be applied before assembling the elements or even thereafter. This surface treatment can be rendered by applying a wood preservative, lacquer layer or color layer. With this surface treatment, the surface quality, the resistance, the cleanability of the furniture elements can be increased or, occasionally, the natural color of the wooden products can be altered, too.

Further to this, the furniture in this invention can be provided with upholstering, for the purpose of which natural materials are preferred. In accordance with this, the upholstery can be made of woven or spun material, and for greater demands of leather.

Thanks to the production method of the furniture as described above, a great variability can be rendered with respect not only to the types and assortment of furniture but to their measurements, too. The furniture elements formed as above mentioned can be provided as kind of modular elements each tenon of which being insertable into every mortise, with the help of which a great variety of furniture can be assembled and, thus, special needs and requirements can be fulfilled.

In the apparatus as described in this invention, the tenoning machine as well as the center-gauge are formed as stations of it and, thus, that of the working procedure.

As is shown in FIG. 1, in this exemplified embodiment of the tenoning machine, grips 2 and 3 are provided for holding a wooden material 1. In sense of the invention, grip 3 is slideably arranged on a frame 4 of the tenoning machine, while grip 2 is fixed to frame 4. Grip 3 has a conical thrust center 5 onto which the other end of wooden material 1 in the form of a tree-trunk or a tree branch is connected. Therefore, wooden material 1 can be rotated with respect to grip 3. In contrast to this, grip 2 has a rod being adjustable in the longitudinal direction. This is provided in this embodiment in the form of a screw spindle 6 having a screw-and-nut connection 9 between spindle 6 and grip 3.

On an end of screw spindle 6 facing thrust center 5, a turning fork 7 is arranged with the help of which spindle 6 is connected to wooden material 1. Longitudinal axes of thrust center 5, turning fork 7 and screw spindle 6 are aligned with the longitudinal axis of wooden material 1.

On the other, outer end of screw spindle 6, a crank-handle 8 is arranged with the aid of which spindle 6 can be rotated, which also causes the turning fork 7 to rotate.

Wooden material 1 will be clamped in between grips 2, 3 for the working procedure by connecting thrust center 5 and turning fork 7 to the ends of wooden material 1, respectively. As mentioned above, grip 3 is not fixed to frame 4 of the tenoning machine but it can slide on it. Wooden material 1 will be loaded through thrust center 5 by a constant thrust force which is provided, in this simple embodiment, by a weight 10 connected to grip 3 by a chain 12 guided on a pulley 11 rotationally arranged in frame 4.

The tenoning machine is this invention has, furthermore, a rotationally driven milling disk 13 being adjustable perpendicularly as well as in a direction parallel to the longitudinal axis of wooden material 1. This milling disk 13 has a toothed outer edge as usual with this kind of working tools for wooden products.

In function of this embodiment of the tenoning machine in this invention, wooden material 1 selected, debarked, dried and cut to size is arranged in between thrust center 5 of grip 3 and turning fork 7 of grip 2 by moving grip 3 away from grip 2 against the force of weight 10. After inserting wooden material 1 in between grips 2 and 3, grip 3 is left free and the force of weight 10 will press thrust center 5 and turning fork 7 into wooden material 1. Once inserted between the conical thrust center 5 and the turning fork 7, the wooden material 1 is caused to rotate on the thrust center 5 by rotation of the turning fork 7. The turning fork 7 is inserted in the end of the wooden material 1 which causes said material to rotate with the turning fork.

After this, rotating milling disk 13 is positioned near to wooden material 1, the depth of cut is defined by positioning milling disk 13 a certain distance from the middle axis of wooden material 1 and screw spindle 6 rotated by turning crank-handle 8. As a result of this, wooden material 1 will also be rotated through turning fork 7 in the course of which wooden material 1 will also move toward grip 2. The pitch of screw-and-nut connection 9 will define the feed of the milling operation.

As a matter of course, the motions necessitated for forming a tenon 14 can be provided with other machinery, too. However, a simultaneous rotational motion and a feed motion have to be rendered possible. For maintaining the clamped situation of wooden material 1, grip 3 sliding on frame 4 presses thrust center 5, wooden material 1 as well as turning fork 7 with a constant force, in the shown example, since the gravitational force of weight 10 does not change while chain 12 rolls on pully 11. As a result, grip 3 follows the feed motion of wooden material 1.

In FIG. 2, a preferred embodiment of the counter-gauge of this invention is shown. On frame 4, a sliding bed 15 is arranged which can be moved on frame 4 but it can also be fixed thereto. On this sliding bed, grips 2 and 3 are mounted, the longitudinal positions of at least one of them, in this example that of both of them being adjustable in respect to frame 4. Turning fork 7 is, in this embodiment, too, attached to grip 2 and thrust center 5 to grip 3, but feed motion is in this case not required since, herein, only mortises are to be produced in certain positions. Therefore, turning fork 7 can be moved in respect to grip 2 but it can be arrested with the help of a bolt 16 in certain angular positions. Further to this, a screw spindle 18 turnable with a crank-handle 17 on the inner end of which thrust center 5 is arranged.

The counter-gauge drilling the mortises as in this invention has a drill 19 which is arranged perpendicularly to the longitudinal axis of wooden material 1 in a drilling machine 20. Drill 19 is formed as usual in the wooden industry and it provides a mortise into which tenon 14 closely fits.

The described embodiment of the counter-gauge functions as follows.

For clamping wooden material 1, the positions of grip 2 and 3 on sliding bed 15 is adjusted with respect to each other for being a distance between turning fork 7 and thrust center 5 which is greater than the length of wooden material 1. After this, crank-handle 17 and, with this, screw spindle 18 are turned and, because of the screw-and-nut connection between spindle 18 and grip 3, thrust center 5 as well as turning fork 7 will be pressed into wooden material 1. This provides a connection between turning fork 7 and wooden material 1 without any relative rotation. After wooden material 1 is clamped as mentioned above, sliding bed 15 will be moved on frame 4 and, with this, the relative position of wooden material 1 to drill 19 will be adjusted. In this position, sliding bed 19 is fixed without movement on frame 4. With drill 19 driven rotationally and drilling machine 20, the mortise will be formed.

The assembly of the wooden elements necessitates more than one mortise in wooden material 1 which, in a given case, have a certain angular position, 90 degrees to each other. In this example, this is achieved with a desired accuracy by removing bolt 16 and rotating turning fork 7 and with this, wooden material 1, too, around its own axis. After reaching the next required position, turning fork 7 will again be retained in position by bolt 16 and further rotation of wooden material 1 is prevented. Thereafter, the next mortise can be formed in this position by drill 19 and drilling machine 20 as described above. Of course, sliding bed 15 can also be moved on frame 4 for determining the position of this mortise.

In FIG. 3, three furniture elements 21, 22 and 23 are shown in perspective view. On each end of furniture element 22, tenons 14 and in furniture elements 21 and 23, mortises 24 are provided, respectively. Tenons 14 are coaxial to mortises 24. Further to this, another mortise 25 being perpendicular to mortise 24 is provided in furniture element 23. In FIG. 3, it is also shown that a kind of upholstery 26 can be provided on furniture element 22. If, furniture elements 21, 22 and 23 are parts of a chair, furniture elements 21 and 23 can be chair-legs and upholstery 26 can be the sitting surface which is spanned also on a further furniture element being parallel to furniture element 22 and not shown in the drawing. With the help of mortise 25, the connection to the other chair-legs can be provided.

In FIG. 3 is also shown that an incission 27 can be made in tenon 14 into which a wedge expander 28 can be driven after tenon 14 being arranged in mortise 24. With this, the stability of the connection between tenon 14 and mortise 24 can efficiently increased.

As is mentioned above, the described embodiments of the apparatus in this invention are very simple and serve only the illustration of the main ideas realized in this invention. Nevertheless, modern working machines and techniques of the wooden and furniture industries can find utilization. At the same time, however, it will be clear from what have been said above that the invention can also be realized by very simple means and devices.

We claim:

1. An apparatus for the production of furniture elements from cut and debarked tree trunks or branches, said apparatus comprising means to retain one said tree trunk or branch in a position rotatable about its longitudinal axis, said retaining means including first and second gripping means disposed at each end of said cut tree trunk or branch, at least one of said first and second gripping means being capable of movement along the longitudinal axis of said tree trunk or branch;

said first gripping means being adapted to fixedly retain one end of said cut tree trunk or branch and said second gripping means being adapted to permit an adjacent end of said cut tree trunk or branch to rotationally engage said second gripping means;

screw means for both rotating said first gripping means and moving said first gripping means along said axis; and cutting means positioned adjacent said tree trunk or branch to cut thereon a tenon of circular cross section upon rotational and longitudinal movement of said tree trunk or branch.

2. An apparatus as claimed in claim 1, in which said cutting means comprises a rotationally driven milling disk.

3. An apparatus as claimed in claim 1, and means continuously yieldably urging said second gripping means toward said first gripping means.

4. An apparatus as claimed in claim 1, in which said second gripping means comprises a pin having a conical surface on which said adjacent end of said cut tree trunk or branch is retained and rotates.

* * * * *